United States Patent Office.

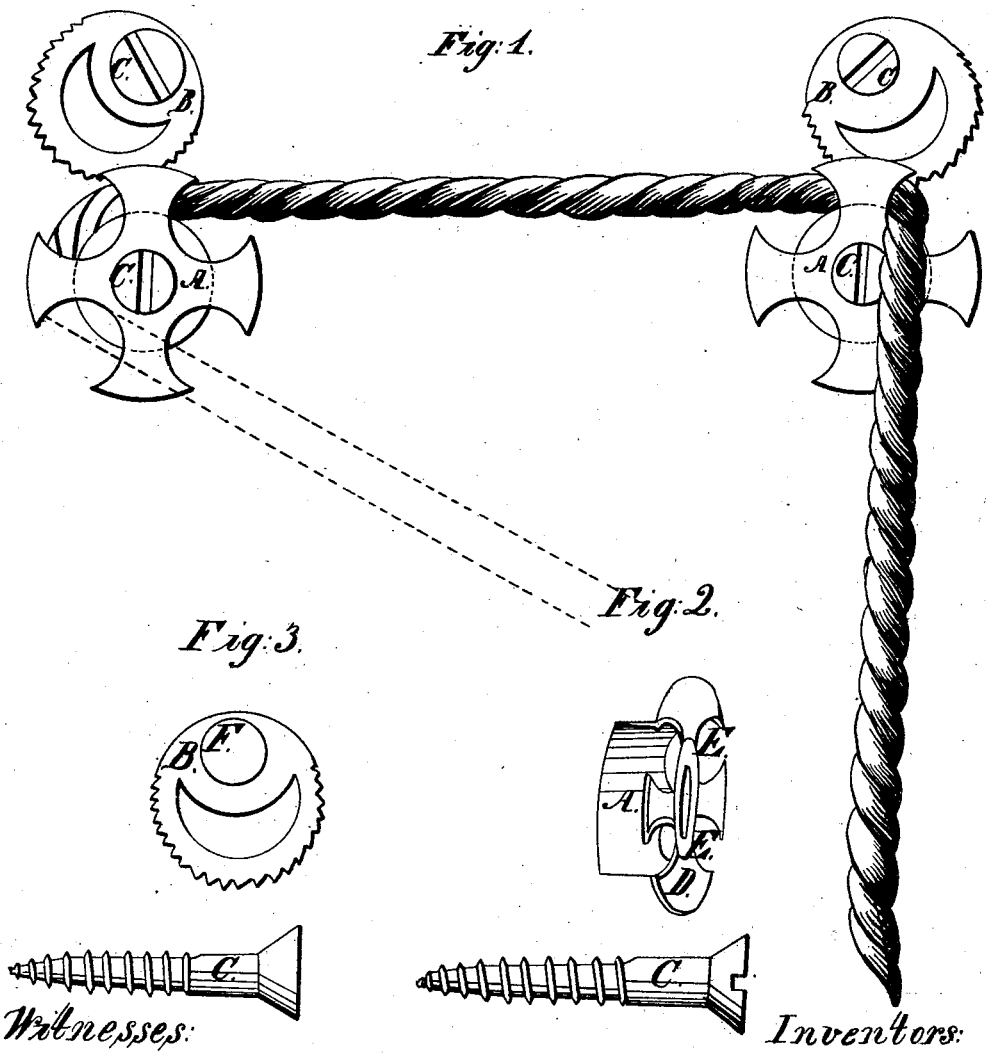

OSKER S. PERKINS AND JOHN R. RICHARDS, OF MOUNT JOY, PENNSYLVANIA, ASSIGNORS TO THEMSELVES AND JOSEPH H. FERGUSON.

Letters Patent No. 79,593, dated July 7, 1868.

IMPROVED CLOTHES'-LINE HOLDER.

The Schedule referred to in these Letters Patent and making part of the same.

TO ALL WHOM IT MAY CONCERN:

Be it known that we, OSKER S. PERKINS and JOHN R. RICHARDS, of Mount Joy, in the county of Lancaster, and State of Pennsylvania, have invented a new and useful Clothes'-Line-Holding Device; and we do hereby declare that the following is a full, clear, and exact description of the same, reference being had to the annexed drawing, and to letters of reference being marked thereon, making a part of this specification, in which—

Figure 1 is a perspective view of the line-holders as they appear when placed on posts or trees, with one section of the line stretched.

Figure 2 is a pulley-wheel, four sections of the rim formed into hooks.

Figure 3 is an eccentric.

Figure 4 are wood-screws.

The object of this invention is for the stretching and holding of a clothes-line. The pulley-wheel A A A, having the rim D, fig. 2, formed into hooks, by taking circular or angular sections E E from it, with countersunk screw-hole through its centre; the eccentric B B B having two-thirds of its tread notched, the opposite side having one-half its thickness sloped off, and countersunk screw-hole F. The pulley-wheel A A A may be screwed to a post or tree by wood-screw C. The eccentric, B, is placed in a perpendicular line above the pulley with wood-screw C, the two being brought together, touching each other.

The eccentric being raised, the line placed in is fastened at the point of beginning, passed over the pulley on the next post or tree, and leaving the line slack, so that it may be easily reached and filled with clothes. It can then be drawn up at either end tight. This completes one section. The line may now be carried to a right or acute angle over the face of the pulley, as desired by the operator, the hooks of the rim accommodating in any direction, and keeping the line from raising the eccentric and slipping off the pulley, as shown, when the second and continuing angles are run from one point to another, whatever the situations of objects may be in the yard on which the fasteners are placed.

What we claim, and desire to secure by Letters Patent, is—

1. A pulley-wheel, with hooks formed of its outer rim, or equivalent, in the manner shown, and for the purpose specified.

2. A hooked pulley-wheel, all combined and arranged in the manner shown and specified, and for the purpose set forth.

OSKER S. PERKINS,
JOHN R. RICHARDS.

Witnesses:
C. H. COLBORN,
JOHN HEPBURN.